Figure 1:
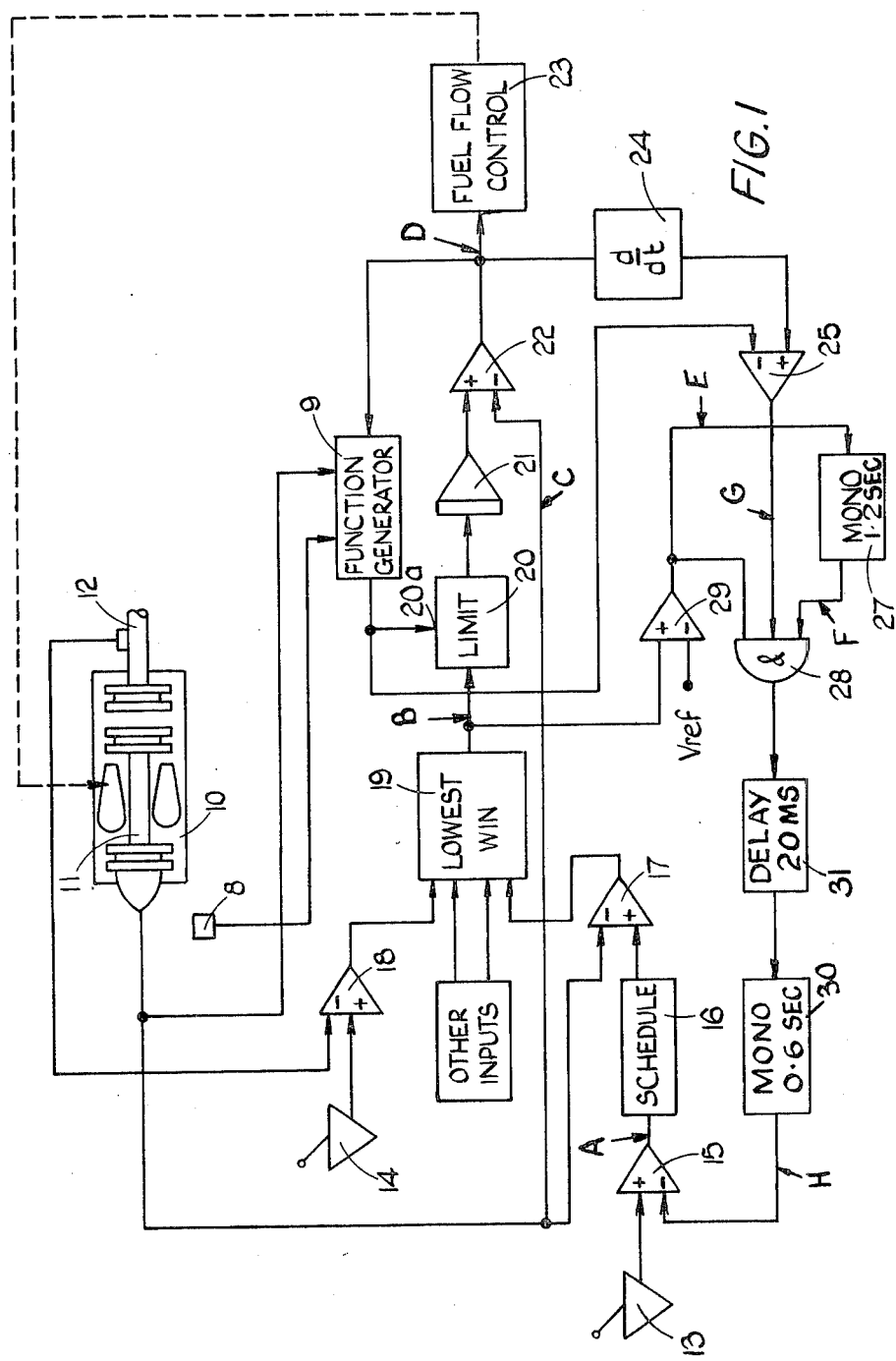

United States Patent [19]

Saunders et al.

[11] 4,040,250
[45] Aug. 9, 1977

[54] ELECTRONIC FUEL CONTROL FOR A GAS TURBINE ENGINE

[75] Inventors: Arthur Frank Saunders, West Midlands; Graham John Hindmarsh, Birmingham, both of England

[73] Assignee: Lucas Industries Limited, Birmingham, England

[21] Appl. No.: 598,048

[22] Filed: July 22, 1975

[30] Foreign Application Priority Data

July 24, 1974 United Kingdom ............ 32637/74

[51] Int. Cl.² .......................................... F02C 9/08
[52] U.S. Cl. .......................... 60/39.28 R; 60/39.16 R
[58] Field of Search ............... 60/39.28 T, 39.28 R

[56] References Cited

U.S. PATENT DOCUMENTS

| | | | |
|---|---|---|---|
| 3,098,356 | 7/1963 | Joline | 60/39.28 R |
| 3,174,529 | 3/1965 | Grosselfinger | 60/39.28 R |
| 3,295,317 | 1/1967 | Blackaby | 60/39.28 R |
| 3,421,317 | 1/1969 | Bedford | 60/39.28 R |
| 3,688,504 | 9/1972 | Hutchinson | 60/39.29 X |
| 3,739,250 | 6/1973 | Beadman | 60/39.28 T |
| 3,774,395 | 11/1973 | Greune | 60/39.28 T |
| 3,852,958 | 12/1974 | Adams | 60/39.28 R |
| 3,868,625 | 2/1975 | Speigner | 60/39.28 R |
| 3,982,389 | 9/1976 | Maker | 60/39.28 R |

Primary Examiner—Clarence R. Gordon

[57] ABSTRACT

An electronic gas turbine fuel control of the slave datum type, i.e. one including a circuit which generates a speed error signal, an electronic integrator which integrates that error signal to produce a speed datum signal and a difference amplifier comparing the speed datum signal with the actual engine speed to produce a fuel error signal, incorporates a surge detection and recovery circuit. For detection the rate of change of the fuel error signal is derived and compared with a reference value varying with engine conditions. For recovery, if the rate of change exceeds the reference value for a predetermined time during acceleration, the speed error signal is caused to go negative for a fixed period to ramp the integrator output downwards, after which acceleration is allowed to recommence.

7 Claims, 2 Drawing Figures

ELECTRONIC FUEL CONTROL FOR A GAS TURBINE ENGINE

This invention relates to an electronic fuel control for a gas turbine engine, such fuel control being of the kind comprising means for generating an engine speed error signal, limiter means sensitive to engine operating conditions to limit said speed error signal, an integrator for integrating said error signal, a first difference amplifier for comparing the output signal of the integrator with an engine actual speed signal to produce a fuel error signal, and a fuel flow control actuated by said fuel error signal controlling fuel flow to the engine.

Although systems of this kind have many advantages, difficulties can arise when the engine surges during rapid acceleration. The limiter referred to is intended to ensure that the ramp rate of the integrator output during acceleration is such that engine surge will not normally occur. To obtain the maximum performance from the engine, however, it is necessary to run the engine quite close to its surge level and an abnormal load applied during acceleration could create surge. When a surge condition exists the engine speed will fail to keep pace with the output of the integrator so that the fuel error signal will increase quickly and recovery from the stall will become difficult, if not impossible.

It is thus an object of the present invention to provide a fuel control as defined above with surge detection means in a convenient form.

According to the invention an electronic fuel control of the kind specified includes a surge detection means comprising means for producing a signal corresponding to the rate of change of the output of the difference amplifier, and comparator means connected to produce a surge indication signal when said rate of change signal exceeds a predetermined level for a predetermined period.

The comparator means may comprise a voltage comparator for comparing the rate of change signal with a predetermined voltage level and a delay circuit in the output of the comparator for preventing the output of the comparator producing a surge indication signal until said predetermined period has elapsed.

The predetermined voltage level may be varied in accordance with prevailing engine operating conditions.

A surge indication signal muting arrangement may be provided for preventing a surge indication signal being produced at the commencement of acceleration following a sudden change in the speed demand.

A monostable circuit may be provided which is triggered by the surge indication signal, and monostable circuit providing an input to the means for generating the speed error signal so as to reduce the error signal to a negative value for the duration of the output pulse of the monostable circuit, thereby effecting automatic reduction of the output of the integrator and hence of the output of the difference amplifier.

Figure 2:
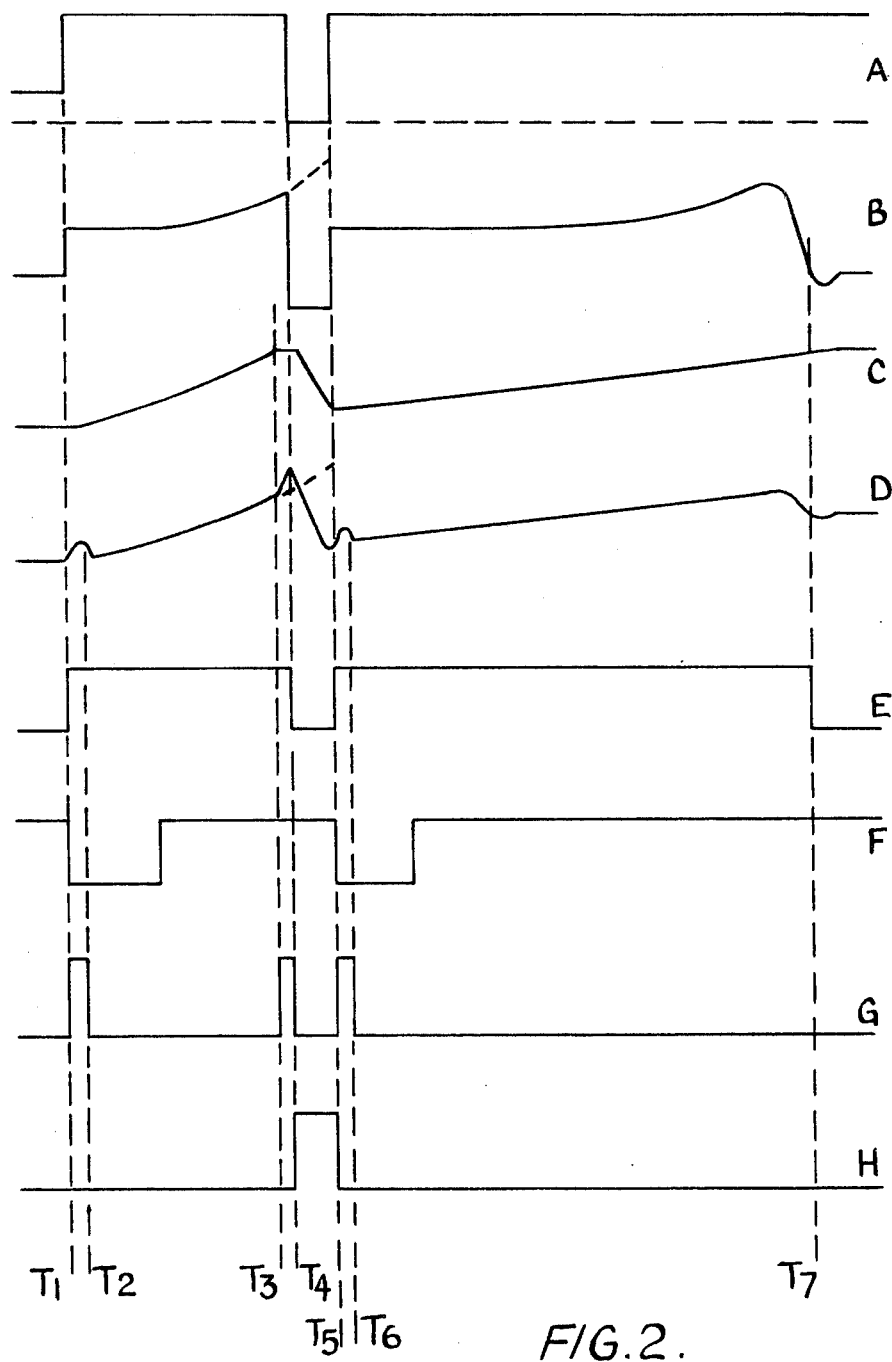

An example of the invention is illustrated diagrammatically in the accompanying drawings, in which FIG. 1 is a circuit diagram and FIG. 2 is a graph showing wave forms at various points in the circuit.

The drawing shows the bare essentials of a fuel control system for gas turbine engine 10 with a main spool 11 and a free turbine 12 for taking off power. The pilot has two speed controls 13 and 14 for controlling the speed of the main spool 11 and that of the free turbine 12. Each such control produces an electrical signal corresponding to the desired speed of the appropriate part and transducers in the engine sense the actual speeds and produce signals corresponding to such actual speeds. In the case of the control 13 the output signal is passed through a difference amplifier 15 which will be referred to hereinafter. The output of the amplifier 15 is fed to a scheduling circuit 16 the output of which is constant and positive for all values of the input signal less than a predetermined value and the output of which rises linearly with the input signal for values of the input signal in excess of this predetermined value. This arrangement is intended to ensure that, once the engine has been started the fuel flow to the engine does not fall below that required to sustain combustion. The system also includes alternative arrangements which are operative during starting but these are not described herein since they are not relevant to the present invention.

The output of the scheduling circuit is supplied to a difference amplifier 17 to which the actual spool speed signal is also supplied and which thus produces a gas generator spool speed error signal. This signal is positive when the actual speed is less than the desired speed. There is also a difference amplifier 18 which compares the signals from the control 14 and the free turbine speed transducer and produces a free turbine speed error signal which is positive when the free turbine speed is less than the desired speed.

The output terminals of the two amplifiers 17 and 18 are connected to a "lowest wins" gate 19 together with other error or limit signals not relevant to the gist of the present invention. The lowest of the signals arriving at this gate 19 appears at its output terminal which is connected to a well-known limiter circuit 20 which applies a variable limit to the error signal. When the error signal is less than this limit it passes through the circuit 20 unchanged. The limit applied to the error signal is variable by means of a signal applied to a control terminal 20a of the circuit 20.

The output terminal of the limiter circuit 20 is connected to the input terminal of an integrator 21. The output terminal of the integrator 21 is connected to one input terminal of a difference amplifier 22 the other input of which is connected to the gas generator spool speed transducer. The output of the integrator 21 represents the instantaneous speed datum so that the output of the amplifier 22 is a speed error signal and this error signal is fed to an integrating type fuel flow control 23 which supplies fuel to the engine at a rate which is varied in accordance with fluctuations of this speed error signal.

The limit circuit 20 is controlled by a function generator 9 which receives input signals from the output terminal of the amplifier 22, from the gas generator actual speed transducer and from an ambient pressure transducer 8.

With the system as described above, in steady state conditions, the error signal from one of the two amplifiers 17 and 18 will be zero and the other will be positive. Thus the input to the integrator 21 will be zero and its output will be constant so that at a particular gas generator spool speed the amplifier 22 will produce an output at a sufficient level for the fuel flow control 23 to supply sufficient fuel to the engine for that speed to be maintained. The one of the amplifiers 17, 18 which has a zero output in steady state conditions is in actual control at that time of the speed datum signal. If it is the amplifier 18 which is in control, any fluctuations in the measured free turbine speed (caused by varying loads on the turbine) will cause shifts in the speed datum signal which in turn vary the signal applied to the fuel flow control to vary the gas generator speed and thereby correct the free turbine speed. In these conditions the gas generator spool speed is limited by the setting of the control 13 so that if the selected gas generator spool speed reaches the limit set by the control 13 the output of amplifier 17 will become zero and this amplifier will assume control.

During acceleration, i.e. after the control 13 or 14 which was in control at the time is moved to demand a higher speed, the limit circuit 20 determines the maximum level of the input to the integrator 21 and thus controls the ramp rate of the integrator 21. Normally the ramp rate is selected to ensure that the rate of change of the gas generator spool speed can keep pace with the rising output of the integrator.

The system as described thus far does not take into account the situation which arises when surge occurs during acceleration and the gas generator starts to slow down whilst the integrator output is still increasing. As described the immediate effect of such a situation would be for the fuel flow to the engine to be increased, thereby worsening the surge.

The system shown has therefore been provided with a surge detection means which includes a differentiating circuit 24 which receives its input from the output terminal of the difference amplifier 22 and produces an output signal proportional to the time differential of the output of amplifier 22. The output terminal of the differentiating circuit 24 is connected to one input terminal of a voltage comparator circuit 25 which receives at its other input terminal a reference signal from the function generator 9 so that the comparator circuit 25 produces a positive going output whenever the output of the differentiating circuit 24 exceeds that of the function generator 9. The function generator 9 is designed to produce an output which is empirically determined to suit the engine in question, both as regards acceleration limiting and surge detection.

The output terminal of the circuit 25 is connected to one input terminal of an AND gate 28 which also has an input terminal connected to the output terminal of a first monostable circuit 27. A further input terminal of the AND gate 28 is connected to the output terminal of a further voltage comparator 29 which has one input terminal connected to the output terminal of the "lowest wins" gate 19 and its other input terminal connected to a reference voltage source. The monostable circuit 27 has its input terminal connected to the output terminal of the comparator 29 and normally provides a positive output signal. The output of the monostable circuit 27 goes low, for say 1.2 seconds, whenever the output of the comparator 29 goes high. The comparator 29 serves to block the AND gate 28 when the error signal is small so that the surge detection means is not triggered during normal steady running conditions by fluctuations in the load on the free turbine. The monostable circuit 27 ensures that the AND gate 28 is blocked during short duration peaks in the output of the differentiating circuit 24 at the start of an acceleration period (as will be explained in more detail in connection with FIG. 2).

The output terminal of the AND gate 28 is connected via a 20MS delay circuit 31 to the input terminal of a second monostable circuit 30 which produces a positive going pulse of fixed duration — say 0.6 seconds — whenever the AND gate 28 produces an output not more than 20MS. The output terminal of the monostable circuit 30 is connected to an input terminal of the difference amplifier 15 so that when the pulse referred to is produced the output of the amplifier 15 becomes negative and the output of the scheduling circuit 16 falls immediately to its minimum value. Thus, the output of the amplifier 17 becomes negative and is therefore passed through the gate 19 and causes the integrator 21 to ramp downwardly for the duration of the pulse. At the end of the pulse the system will take over normal control again and the engine will be accelerated normally back to the speed set by either one of the controls 13, 14.

Referring now to FIG. 2 a typical surge-during acceleration situation is depicted. At time $T_1$ the control 13 is shifted to demand a step change in gas generator speed the signal A at the output of the difference amplifier 15 thus rises substantially instantaneously and there is a corresponding rise in the signal B at the output of the "lowest wins" gate 19. Because of various lags in the fuel system engine feedback loop there is a delay before the signal C from the gas generator speed transducer starts to rise, but the output of the integrator 21 has started to rise immediately. As a result a small peak occurs in the speed error signal D from the difference amplifier 22 between $T_1$ and $T_2$ which causes the comparator 25 to be operated so that its output goes high. However, the appearance of a sufficient positive going error signal at B causes the signal at the output of the comparator 29 to go high so that the signal G at the output of the monostable circuit 27 goes low for 1.2 seconds commencing at $T_1$. AND gate 29 is thus blocked and no surge indication signal is passed back to the difference amplifier 15.

Acceleration now continues normally until time $T_3$ (more than 1.2 seconds from $T_1$) when a surge condition commences. This is detected by the comparator 25 and since the comparator 29 is still providing a high output signal and the monostable circuit 30 has reset the gate 28 will produce a high output signal which, after the 20MS delay set by the delay circuit 31 causes the output of the monostable circuit 30 to go high thereby causing the integrator output to ramp down for 0.6 seconds.

When acceleration recommences there will be a small peak in the speed error signal between $T_5$ and $T_6$, but since the output signal B went negative during the 0.6 second integrator ramp down period the output signal E from the comparator 29 also went low and monostable circuit 27 is again triggered at $T_5$ to mute the surge indication signal as at $T_1$.

The final time $T_7$ in FIG. 2 is the time at which the gas generator 11 attains a speed within ½% of that selected so that the output signal E of the comparator 29 goes low. Thereafter normal governing action is restored and any transients which are sufficient to operate the comparator 25 are muted even if they exceed 20MS in duration.

We claim:

1. An electronic fuel control for a gas turbine engine, comprising: means for generating an engine speed error signal, limiter means sensitive to engine operating conditions to limit said speed error signal, an integrator for integrating said error signal, a first difference amplifier for comparing the output signal of the integrator with an engine actual speed signal to produce a fuel error signal, and a fuel flow control actuated by said fuel error signal controlling fuel flow to the engine, surge detection means comprising means for producing a signal corresponding to the rate of change of the output of the difference amplifier, and a comparator means connected to produce a surge indication signal when said rate of change signal exceeds a predetermined level for a predetermined period.

2. An electronic fuel control as claimed in claim 1 in which said comparator means comprises a first voltage comparator connected to said means for producing a signal corresponding to the rate of change of the output of the difference amplifier and to a reference signal source and a delay circuit connected to the output of said first voltage comparator for preventing the output of the first voltage comparator producing a surge indication signal until said predetermined period has elapsed.

3. An electronic fuel control as claimed in claim 2 in which said reference signal source is a function generator producing an output signal with engine operating conditions.

4. An electronic fuel control as claimed in claim 3 in which said limiter means is controlled by said function generator.

5. An electronic fuel control as claimed in claim 2 in which there is provided a surge indicating signal muting arrangement for preventing a surge indicating signal being produced at the commencement of acceleration following a sudden change in the speed demand.

6. An electronic fuel control for a gas turbine engine, comprising: means for generating an engine speed error signal, limiter means sensitive to engine operating conditions to limit said speed error signal, an integrator for integrating said error signal, a first difference amplifier for comparing the output signal of the integrator with an engine actual speed signal to produce a fuel error signal, and a fuel flow control actuated by said fuel error signal controlling fuel flow to the engine, surge detection means comprising means for producing a signal corresponding to the rate of change of the output of the difference amplifier, a comparator means connected to produce a surge indication signal when said rate of change signal exceeds a predetermined level for a predetermined period, said comparator means comprising a first voltage comparator connected to said means for producing a signal corresponding to the rate of change of the output of the difference amplifier and to a reference signal source and a delay circuit connected to the output of said first voltage comparator for preventing the output of the first voltage comparator producing a surge indication signal until said predetermined period has elapsed, and a surge indicating signal muting arrangement for preventing a surge indicating signal being produced at the commencement of acceleration following a sudden change in the speed demand, said muting arrangement including a second voltage comparator connected to the means for generating an engine speed error signal and arranged to produce an output when that error signal exceeds a predetermined value, a logic gate connected to the outputs of said first and second voltage comparators and to a monostable circuit connected to be triggered by said second comparator, said monostable circuit blocking the logic gate for a predetermined period after the second comparator starts to produce said output.

7. An electronic fuel control as claimed in claim 6 including a further monostable circuit connected to said comparator means for triggering by the surge indicating signal and providing an input to said means for generating the speed error signal so as to reduce that error signal to a negative value for the duration of the output pulse of said further monostable circuit, thereby effecting automatic reduction of the output of the integrator and hence of the output of the error amplifier producing the fuel error signal.

* * * * *